J. E. CRANDALL.
STAPLING TOOL.
APPLICATION FILED SEPT. 28, 1915.
1,250,566.
Patented Dec. 18, 1917.
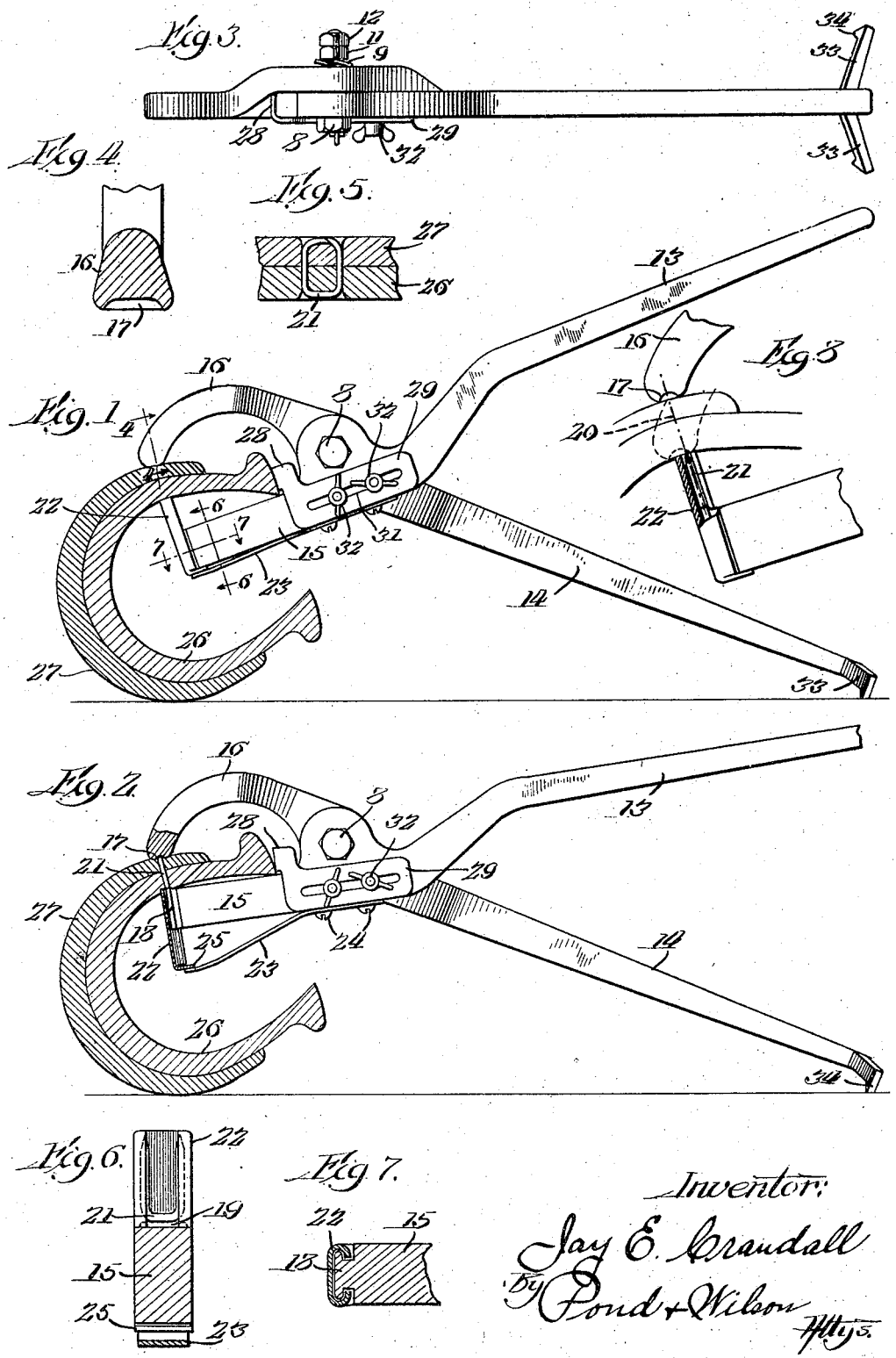

UNITED STATES PATENT OFFICE.

JAY ELLIS CRANDALL, OF BELVIDERE, ILLINOIS.

STAPLING-TOOL.

1,250,566.  Specification of Letters Patent.  Patented Dec. 18, 1917.

Application filed September 28, 1915. Serial No. 52,987.

*To all whom it may concern:*

Be it known that I, JAY E. CRANDALL, a citizen of the United States, residing at Belvidere, in the county of Boone and State of Illinois, have invented certain new and useful Improvements in Stapling-Tools, of which the following is a specification.

The practice has comparatively recently grown up of taking two worn automobile tire casings and putting them together so as to produce one new or re-built casing which will give a considerable amount of service. The method of rebuilding or making a new casing from two worn casings has been, prior to my present invention, substantially as follows:

The beads were first cut off from one casing and this casing was then placed over the tread portion of another worn casing and secured thereto by stitching and vulcanizing the two casings together. Two worn casings, either of which alone was incapable of further service, were thereby united to produce a casing which could be used for some time. The process, however, has been rather expensive because of the difficulty in stitching the heavy casings and also because of the expense of vulcanizing. The vulcanizing was necessary by reason of the fact that the stitches which were exposed to dirt and moisture in service were incapable of sustaining the strain to which the tire is subjected in use for any considerable period, as they would chafe and rot and eventually break. The vulcanizing of the two casings together relieved the strain on the stitches and thereby prolonged the life of the rebuilt casing.

My present invention aims in general to cheapen the cost of rebuilding these casings by eliminating the expensive stitching and vulcanizing operations and also aims to produce a rebuilt casing which will be stronger and more durable than the stitched and vulcanized casings heretofore made and which can be produced at much cheaper cost.

More particularly my present invention contemplates the production of a tool by means of which the casings can be quickly and economically secured together by means of staples, and my present invention is therefore designed to produce a strong, durable and cheap tool which will be efficient and satisfactory for the purpose above outlined.

A further object of my invention is to produce a tool of the character indicated which will hold a staple in the requisite position to be inserted through the overlapped casings, and which will force the staples through the casings and clench them down flush with the outer casing to thereby securely and permanently fasten the casings together.

Another object of my invention is to provide an adjustable abutment on a tool of this character against which the beaded edge of the inner casing may abut to thereby insure that all the staples will be positioned exactly the requisite distance from the edge of the casing, the abutment being made adjustable to enable the tool to be adapted to various sizes of casings.

Still another object is to provide a tool which can be set on the floor or work bench and which will stand in operative position while the tire is being placed therein, and which will retain this position when the stapling operation is being performed by the operator, who grasps one handle of the tool only.

The foregoing and other objects and advantages of this invention will be more readily apparent as the same becomes better understood by reference to the following description when considered in connection with the accompanying drawings, on which—

Figure 1 is a side elevation of a tool embodying my invention shown in the position which it will assume just prior to the insertion of a staple into the overlapped casings;

Fig. 2 is a similar view showing the position of the parts at the completion of a stapling operation;

Fig. 3 is a plan view of the tool shown in Figs. 1 and 2;

Fig. 4 is a sectional view on the line 4—4 of Fig. 1;

Fig. 5 is a fragmentary sectional view showing a staple inserted through the casings and clenched;

Figs. 6 and 7 are sectional views on the lines 6—6 and 7—7, respectively, of Fig. 1, and Fig. 8 is a fragmentary view of the ends of the clenching jaws.

By reference to the drawings it will be observed that the tool comprises primarily two levers shaped as shown in the drawings and pivotally connected together by a bolt 8 which, as shown in Fig. 1, is equipped with a spring washer 9, a nut 11, and a locknut 12 by which the levers are held in proper relation with respect to each other. The long arms of the levers are shaped to provide handles 13 and 14 while the short arm of the corresponding levers are shaped to provide jaws 15 and 16 respectively. It will be observed that the upper jaw 16 is curved, as shown, and is provided at its end with a staple-clenching depression 17 into which the ends of the staple are forced when the jaws are closed, the depression being shaped to bend the ends of the staple inwardly toward each other and to clench them down flat and flush with the outer face of the outer casing when the stapling operation is completed. The lower jaw 15 is substantially straight and is T-shaped at its end as indicated at 18 (Fig. 7), the top of the T-shaped portion being slightly elevated as indicated at 19 (Fig. 6) to form in effect an anvil upon which a staple 21 is supported and by which the staple is forced into the casings. Preferably the top of this elevation 19 is slightly concave to accommodate the crown of the staple and prevent its slipping laterally during the stapling operation.

A staple which is to be inserted into and through the casings is held in position with the prongs projecting upwardly in a holder or retainer 22 shaped as shown in cross section in Fig. 7 to slidingly fit the T-shaped portion of the jaw 15 so that the holder 22 may remain stationary beneath the inner casing when the jaw 15 moves upwardly to force the staple into the casing. A leaf spring 23 secured to the lower face of the jaw 15 by screws 24 or other means overlies the inwardly projecting end 25 of the staple holder 22 and normally urges this holder upwardly above the jaw 15 into the position shown in Fig. 1 so that a staple may be positioned in the holder as shown in Fig. 6.

The inner casing which may be of any well known or preferred construction is indicated on the drawings by reference character 26, while the outer casing, from which the beads have been cut, is indicated by reference character 27. After the outer casing has been placed over the inner casing, as shown in these figures, one edge of the casing is inserted between the jaws of the tool and in order to insure that the staples will be positioned the requisite distance from the edges of the casing I have mounted upon the jaw 15 an adjustable abutment 28 which lies between the jaws 15 and 16 ahead of the pivot bolt 8. The abutment is formed preferably integrally upon the base 29 which is equipped with an elongated slot 31 through which bolts attached to the jaw 15 and equipped with thumb nuts 32 project. It will be manifest that the abutment may be adjusted longitudinally of the jaw 15 when the thumb nuts 32 are loosened and that it may be clamped in any desired adjusted position by tightening these thumb nuts.

For the purpose of maintaining the tool in an upright position, as shown in Figs. 1 and 2, during the positioning of a tire between the jaws and during the riveting operations, I have provided the handle 14 with diverging legs 33 which are preferably equipped at their ends with sharpened prongs 34 which will engage the floor or work bench upon which the tool is positioned and prevent the tool from slipping about or tipping over. These prongs remain in engagement with the floor or work bench and the tool is operated by simply pressing down upon the handle 14.

The operation of my improved tool is substantially as follows: A staple is first dropped into the holder, as shown in Fig. 6, with its prongs projecting upwardly. It might be mentioned at this point that it is preferable to use staples which are so formed that the points are disposed coaxially with the staple prongs so that they will go straight through the tire casings without being deflected in any direction during their insertion. One edge of the overlapped casing is then inserted between the jaws and the abutment 28 is set, if necessary, depending upon the size of the tire, to bring the staple the requisite distance from the edges of the casings. If the beaded edge of the inner casing is abutted against the abutment before each stapling operation all of the staples will be positioned in alinement around the tire. The initial operative position of the parts before pressure has been applied to handle 13 is shown in Figs. 1 and 8. It will be here noted, referring to Fig. 8, that the recessed end of the jaw 16 extends slightly beyond the outer extremity of the holder 22 and that the depression or recess 17 is arranged so as to lie in the plane of the staple or the path it will follow, which plane is indicated by the dotted line 20. In other words, the distance between the depression 17 and the pivot axis of the jaws is greater than between the seat 19 and said axis. Should the upper jaw 16 be constructed so that its depression 17 would be disposed, when the jaws are completely closed, as indicated by the upper jaw 16 in dotted lines, Fig. 8, in direct longitudinal alinement with the staple channel of the holder, the points of the staple would not enter the clenching depression when clenching a staple. This will be evident from the fact that the staple will travel in a straight path after entering the inner casing and not in an arcuate path struck from the pivot axis of the jaws as a center. The operator now presses down upon the handle 13 thereby forcing the jaw 15 upwardly to force the staple through the casings and into the depression 17 in the upper jaw which bends them inwardly and flattens them down into the position shown in Fig. 5. The holder 22 in the meantime remains substantially stationary relatively to the casings, and as the jaw moves upwardly relatively to the holder the staple is removed from the holder and clenched into the casings, during which movement the lower end of the holder is swung outwardly, since the lower jaw travels in an arcuate path. It should be observed at this point that upon initial upward movement of the jaw 15 the holder is moved upwardly into engagement with the inner face of the inner casing, so that it acts as a guide for the staple points and insures that staple will enter the casing at the proper point and in the proper direction, although after the staple has entered the casing it will follow a straight path as mentioned above. After the staple has been clenched the jaws are separated, a new staple is inserted in the holder, the casings are moved along a short distance and the operation is repeated until the circumference of the tire has been traversed, whereupon the tire is inverted and the other edges of the casings are secured together in the same manner.

While I have described my invention as being particularly adapted for stapling tire casings together, and while the drawings illustrate this function of my tool, it should be understood that the tool is not restricted to this specific function but is capable of applying staples wherever they may be needed for a similar purpose. Furthermore, my invention is not restricted to the details of construction shown and described but on the other hand the scope of the invention is circumscribed only by the appended claims.

I claim:

1. A stapling tool comprising a pair of operating levers pivotally connected to form a long and a short arm on each lever, the short arm of one of said levers having a substantially flat working face, the short arm of the other of said levers being curved, and a slide mounted on the side of said first mentioned lever and having a gage portion projecting above and overlying said face in the space formed by the curved arm.

2. A stapling tool comprising a pair of operating levers pivotally connected to form a long and a short portion on each lever, the short portion of one of said levers having a substantially flat working face, a staple holder mounted on said portion, a spring for said staple holder on the under side of said portion, the short portion of the other of said levers being upwardly curved and having a clenching depression formed therein, and a gage slidably mounted on the side of said first mentioned lever beneath the point of pivotal engagement, said gage having a portion projecting above and overlying the flat face in the space formed by the curved lever.

JAY ELLIS CRANDALL.